US006947921B2

(12) United States Patent
Notargiacomo et al.

(10) Patent No.: US 6,947,921 B2
(45) Date of Patent: Sep. 20, 2005

(54) METHOD AND SYSTEM FOR CAPTURING MEMORIES OF DECEASED INDIVIDUALS

(75) Inventors: Richard C. Notargiacomo, Penfield, NY (US); David L. Patton, Webster, NY (US); Frank Pincelli, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 292 days.

(21) Appl. No.: 09/898,636

(22) Filed: Jul. 3, 2001

(65) Prior Publication Data

US 2003/0009461 A1 Jan. 9, 2003

(51) Int. Cl.[7] .............................................. G06F 17/30
(52) U.S. Cl. ................................ 707/1; 707/9; 707/10; 707/104.1; 709/217; 709/225
(58) Field of Search .................... 707/1–10, 100–104.1, 707/200–206; 709/217, 219, 225, 229, 223, 224; 345/764, 751, 747, 741, 742, 744, 733

(56) References Cited

U.S. PATENT DOCUMENTS

| 5,696,488 | A | | 12/1997 | Assisi ......................... 340/539 |
| 5,732,231 | A | | 3/1998 | Evans, III .................... 345/716 |
| 5,946,657 | A | | 8/1999 | Svevad ....................... 704/275 |
| 6,340,978 | B1 | * | 1/2002 | Mindrum ..................... 345/764 |
| 6,363,423 | B1 | * | 3/2002 | Chiles et al. ............... 709/224 |
| 6,581,059 | B1 | * | 6/2003 | Barrett et al. ................. 707/9 |
| 6,886,015 | B2 | * | 4/2005 | Notargiacomo et al. .... 707/102 |
| 2002/0032687 | A1 | * | 3/2002 | Huff ........................ 707/104.1 |

* cited by examiner

*Primary Examiner*—Shahid Alam
*Assistant Examiner*—Jean Bolte Fleurantin
(74) *Attorney, Agent, or Firm*—Frank Pincelli

(57) ABSTRACT

A method, system, and computer software product for capturing and distributing memories of a deceased individual. An electronic storage memory database is provided having controls for allowing selective entry of information into said database with respect to said selected individual. Individuals can be pre-authorization for accessing said database for viewing or entering of data into the database with respect to a deceased individual. Also a gatekeeper can be designated for providing editorial control over entry of said data.

18 Claims, 6 Drawing Sheets

VIRTUAL LIVING OBITUARY – General access 49 37

John H. Doe 34
123 Maple St.
Eternity, NY 00001

XYZ Funeral Home 14/21
VIRTUAL LIVING OBITUARY
http://xyz.vlo.com/names/doe 24

DATE OF BIRTH: 1/1/11
DATE OF DEATH: 9/9/99

PLACE OF BIRTH: LIVING, NEW YORK
PLACE OF DEATH: ETERNITY, NEW YORK

MISCELLANEOUS INFORMATION: 39

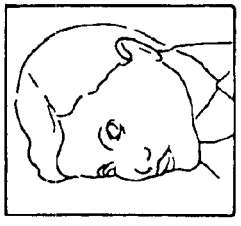

SURVIVED BY: SPOUSE- JANE R. DOE
DAUGHTER- SANDY B. DOE
SON- CHARLIE D. DOE
GRAND DAUGHTER: LINDA E. DOW
GRAND SON: DAVID L. DOE
SISTER: WENDY J. LONGLIFE

35

Multmedia display 48

PREVIOUSLY DECEASED: BROTHER- RICH N. DOE
SISTER: MIRA M. SMITH
36

VISTORS: 38

55

IN LIEU OF FLOWERS PLEASE DONATE TO THE HUMANE SOCIETY. CREDIT CARD # _____ 25

Fig. 2a

VIRTUAL LIVING OBITUARY – Private access  51

John H. Doe  34
123 Maple St.
Eternity, NY 00001

XYZ Funeral Home  14/21
VIRTUAL LIVING OBITUARY
http://xyz.vlo.com/names/doe  24

DATE OF BIRTH: 1/1/11
DATE OF DEATH: 9/9/99

PLACE OF BIRTH: LIVING, NEW YORK
PLACE OF DEATH: ETERNITY, NEW YORK

SURVIVED BY: SPOUSE- JANE R. DOE
DAUGHTER- SANDY B. DOE
SON- CHARLIE D. DOE
GRAND DAUGHTER: LINDA E. DOW
GRAND SON: DAVID L. DOE
SISTER: WENDY J. LONGLIFE

CATEGORIES:  52

PREVIOUSLY DECEASED: BROTHER- RICH N. DOE
SISTER- MIRA M. SMITH

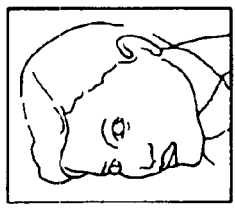
35

Multimedia display  48

38 Family & Friends

55
IN LIEU OF FLOWERS PLEASE DONATE TO THE HUMANE SOCIETY.   CREDIT CARD # _____

METHOD AND SYSTEM FOR CAPTURING MEMORIES OF DECEASED INDIVIDUALS

FIELD OF THE INVENTION

The present invention relates to the compilation and managing of memories of deceased individuals. In particular to a method and system that allows the compilation of images, text or other information with respect to a particular individual from a variety of unrelated sources and also allows controlled access by various individuals.

BACKGROUND OF THE INVENTION

Today when an individual dies, a family member or close friend often writes an obituary with regard to that individual. However, these are typically written from a single point of view and are limited to the point of view of the writer. Also, information for these obituaries is generally taken at a time when the individuals providing the information are under an emotional stress. Thus, these obituaries may not accurately portray or provide a complete understanding of the individual. Finally, these obituaries are generally limited to distribution in local newspapers whereas the individual may have known or been known by many people throughout the country and/or world.

In the case of people who are well known such as celebrities, obituaries are kept on file and can be accessed, reported and/or printed by the media in the event the person passes. This of course is not the case for the majority of people.

Thus there is a need to provide a way for gathering and distributing information with regard to a deceased individual which takes into account points of view from a variety of different individuals, and therefore provides a more complete understanding of the deceased, that can be viewed and distributed in a wide manner.

The present invention seeks to solve these problems by utilizing a communication network, such as the Internet, for allowing people to submit and access an obituary library whereby text messages, images, sound and other data may be submitted and/or accessed by various individuals.

SUMMARY OF THE INVENTION

In accordance with one aspect of the present invention there is provided a method for capturing and distributing memories of a deceased individual, comprising the steps of:

providing an electronic storage memory database that can be accessed over a communication network for displaying at least two web pages for the deceased individual, the web panes each having a unique address for accessing information with respect to the deceased individual and providing restrictive access.

In accordance with another aspect of the present invention there is provided a method for capturing and distributing memories of a deceased individual comprising the steps of:

providing an electronic storage database for displaying a web page of the deceased individual that can be accessed over a communication network, the web pane having a unique address; and providing an access card wherein the unique address of the web page is provided that allows direct access to the web page.

In accordance with yet another aspect of the present invention there is provided a method for capturing and distributing memories of a deceased individual comprising the steps of:

providing an electronic storage database for displaying a web page containing information with respect to the deceased individual that can be accessed over a communication network, the web page having a unique address;

the web page having means for allowing entry of data into the web page by a user with respect to the deceased individual; and providing ordering means for ordering goods and/or services with respect to the information being displayed on the web page and a gatekeeper for having editorial control over entry of the data.

In accordance with still another aspect of the present invention there is provided a method for capturing and distributing memories of a deceased individual comprising the steps of:

providing an electronic storage database for displaying a web page containing information about a deceased individual that can be accessed over a communication network, the web page having a unique address;

providing means for accessing the web page over the communication network;

the web page having means for allowing entry of data into the database with respect to the individual; and providing ordering means for ordering goods and/or services with respect to the information being displayed on the web page.

In accordance with another aspect of the present invention there is provided a method for capturing and distributing memories of a deceased individual, comprising the steps of:

providing and electronic storage memory database for displaying a web page that can be accessed over a communication network, the electronics web page having a unique electronic address; and providing an information card for automatically accessing the database with respect to the deceased individual over the communication network, the information card having machine readable information that can be used for directly accessing the web page.

In accordance with still another aspect of the present invention there is provided a system for capturing and distributing memories of a deceased individual, comprising:

an electronic storage memory database for displaying a web page of the deceased individual that can be accessed over a communication network, a web pane having a unique address.

an access card providing the unique address for use in accessing the web image.

In accordance with one aspect of the present invention there is provided a software product such that when loaded onto a computer it would cause the computer to do the following steps:

providing a pre-authorization for selected individual for accessing a website over a communication network;

providing a gatekeeper for having editorial control over entry of the data on the website by the selected individuals; and providing approval of the data by the gatekeeper prior to being entered into the database.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which:

FIG. 2a illustrates a general access living virtual obituary web page/site made in accordance to the present invention;

FIG. 2b illustrates a private access living virtual obituary web page/site made in accordance to the present invention;

DETAILED DESCRIPTION OF THE INVENTION

Figure 1:
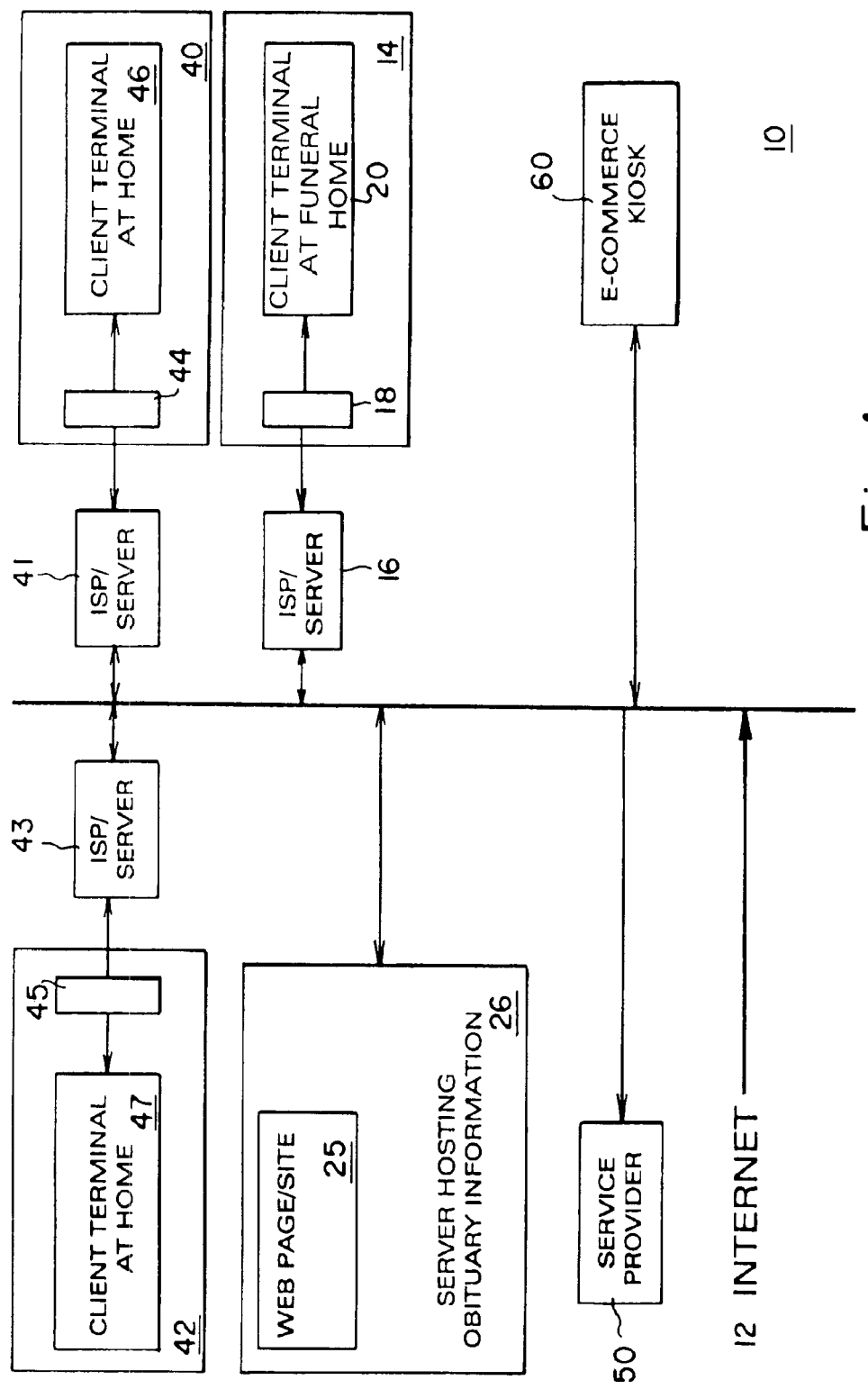
FIG. 1 illustrates a system made in accordance to the present invention for gathering and distributing of information with regard to a deceased individual.

Referring to FIG. 1, there is illustrated a system 10 made in accordance with the present invention for gathering and distributing of information with regard to a deceased individual. In the embodiment illustrated, system 10 includes a communication network 12 that is freely accessible by individuals. In the particular embodiment illustrated the communication network 12 is the Internet. However, it can be any other appropriate communication network that may be utilized. System 10 includes a funeral home 14 or other similar type business establishment having an electronic database that can be accessed by the Internet service provider 16 for allowing communication over the Internet. In the embodiment illustrated the electronic database comprises a computer/server 18. The computer/server 18 includes a data entry system 20, for allowing data entry regarding the deceased individual to be entered either by the funeral home or by any guest, employee or other individual at the funeral home. Typically the data entry mechanism is a keyboard, microphone, digital camera, smart card, computer mouse or other computer data entry device. The computer 18 contains software which enables the users to create and maintain a living virtual obituary web, communicate with the Internet, accept and store data about the deceased, and provide a system for data viewing, adding information, and for providing and maintaining various levels of access to the obituary web page/site 25. The software can reside not only on the hosting server but also on the individual user's personal computer 44, 45 at their home or office and on a Kiosk 60.

Now referring to FIGS. 2a and 2b, the living virtual obituary web page/site is illustrated. The virtual living obituary web page/site 25 is established on behalf of a deceased individual and is hosted on a server 26. This can be established and maintained at the funeral home 14 or may be hosted at a hosting obituary service 21 which is in communication with the Internet 12. The advantage of having a funeral home or hosting service is they can provide the service for a multitude of individuals, thus potentially lowering the cost for each web page established.

The web page/site 25 will have its' own URL 24 that can be accessed via the Internet. The individual who sets up that web page/site 25 (hereinafter referred to as the owner or controller) can be provided with editorial controls for determining the type and manner of allowing information to be entered onto the web page/site 25. The controller can set up a filter for reviewing submitted data for placement on the web page/site 25. For example, the controller can monitor the type of information that is placed thereon and set up appropriate access for third parties. The controller or someone on his/her behalf enters background information about the deceased. For example, the data entry system 20 at the funeral home 14 can be used for establishing and entering initial information regarding the deceased individual. The initial information can include, but is not limited to, the name and address of the deceased 34, names of the surviving family members 35 and previously deceased family members 36 such as brothers, sisters, wives, husbands, children, grand children and great grand children. The initial information can also include a template 37 setting forth the manner and structure of the web page/site 25. Additional information such as a list of authorized individuals 38 to input information into the web page/site 25 and the type of information/data 39 that may be entered on to the web page/site 25. A system similar to the system used in IBM's Lotus Notes software for providing access to a person's calendar by others for viewing, adding meetings, and managing can be set up for accessing the obituary website/page 25. For example, multimedia information 48 such as text, images, and sound that are to be associated with the deceased individual can be entered. In a further embodiment the multimedia information 48 can be used by the deceased to leave a message to people for reading after the individual's death. This can be done either in anticipation of death or not.

The images can be in the form of still images or streaming digital images. As previously discussed, the controller can provide any desired editorial controls. For example, access to the web page/site 25 can be unrestricted or restricted by passwords that are passed out to selected individuals. In addition, certain sections in the web page/site 25 can be set up having different restricted access. For example, there can be a section for general access 49 and a second section such as a private section 51. The general access can be limited to friends, neighbors, and co-workers while the second section may be exclusively for family members and closest friends. It is of course understood that any desired number of sections can be established, each with its own set of authorizing rules for viewing and/or submission data/information. Since different individuals have different points of views and may have many interesting facts/information about the deceased individual that many others may not be aware of, the web page/site 25 provides a mechanism whereby people can share different experiences with the deceased individual. This allows people viewing the web page/site 25 a greater understanding of the individual that has passed. For example, people at work may know certain things that the individual has done that the family would like to know about. However, the deceased individual may have never told the family about these things. The obituary web page/site 25 can also provide related information, for example, full name and addresses of relative's or other individual's etc.

Traditionally funeral homes have been responsible for providing local newspapers with information about the deceased. With the additional information provided by the deceased's family and friend, the funeral home now has the opportunity to notify of out of town newspapers such as the newspaper of the town where the deceased grew up or worked etc. This may be done via a connection to the web page/site 25, or by any other means.

Similarly, the funeral home can notify alumni organizations, service groups and other organizations of which the deceased might have been a member.

The web page/site 25 can also be set up so that text and/or images are placed together or in different locations. The web page/site 25 can include a specific categories 52 which may in turn be further divided into categories, for example sections directed to particular events and times in the life of the deceased individual. It is to be understood that the web page/site 25 can be segmented in any desired manner and structure so as to correspond to the life experiences of the deceased individual.

Another provision of the invention is that the web page/site 25 can also include instructions in the form of a prompt 55 and a place to enter a credit card number for making donations to certain charitable organizations, in lieu of flowers.

Figure 3:
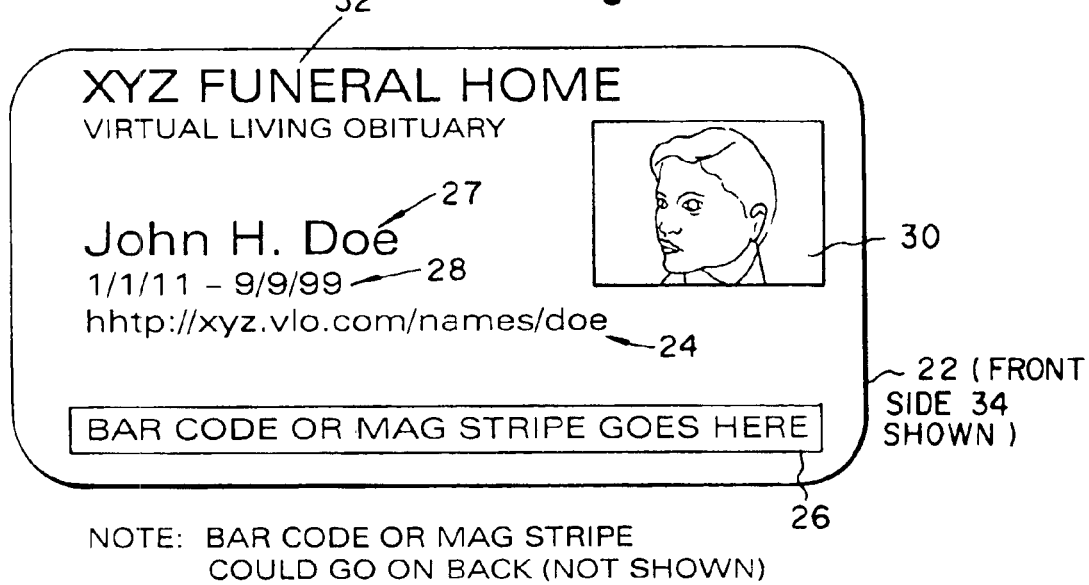
FIG. 3 illustrates an access card for accessing information with regard to a deceased individual distributed from a site as described in FIG. 1.

As previously discussed, the site will have a URL address 24 that can be accessed over the Internet by a variety of individuals. One manner in which information can be accessed or distributed from this site would be through the use of an access card 22 as illustrated in FIG. 3. The access card can include a variety of information but would include at least the URL address 24 of the site. In addition, a bar code or magnetic stripe 29 can be provided for devices that can read this information and automatically go to the site. Additional information such as the name of the deceased 27, the date of birth and the date on which the deceased and passed away 28 can be shown on the card.

In the particular embodiment illustrated, an image 30 of the deceased individual is displayed on card 22 as selected by the person setting up the web page/site 25. Other information such as information about the sponsor 32 can also be provided. For example, this may include information about the sponsoring business establishment that initiated the web page/site, such as the funeral home 14 who handled the funeral arrangements with respect to the deceased, as this may be a way to defray the costs of operating the web page/site. However, it is to be understood the sponsoring organization may be any organization that desires to sponsor the site and/or provide some service related thereto. The cards 22 can be passed out to individuals who visit the funeral home 14 where the deceased is presented (for example at a wake or funeral). Alternatively, the cards 22 can be sent out directly by the controller, or someone on his/her behalf. In the particular embodiment illustrated, the bar code and/or magnetic stripe 26 is illustrated as being on the front side 34. However, it is to be understood that this can be placed on the backside (not shown). Also, any other appropriate information can be placed on either side of the access card 22.

Referring back to FIG. 1, there is illustrated how individuals are given access to the web site. For example, in the embodiment illustrated, individuals at remote sites such as their homes 40 or offices 42 access the web page/site 25 through appropriate Internet service providers 41, 43, respectively. As illustrated, the individuals at home use a personal computer 44 or other type of device to access the Internet 12 and to input data/information to be added to the web page/site 25. The personal computers 44 and 45 are hooked up to data entry devices 46 and 47 respectively. These devices 46 and 47 may include, but are not limited to keyboards, scanners, microphone and/or cameras for enabling images or any other desired data to be uploaded to the web page/site 25. It is to be understood the present invention is not limited to the data/information discussed herein, and that any data/information uploaded and/or displayed at and/or from any location for the purposes described herein is covered by this invention.

In the embodiment previously discussed, people are advised of their ability to access the web site/page 25 through the distribution of an access card 22, FIG. 3. It is of course understood that this information can be disseminated by other means either at the funeral home or through a newspaper or by any other means. In an alternate embodiment, which is especially desirable in situations where access is to be restricted to only close friends and relatives of the deceased, a sign up book (not shown) is provided at the funeral home 14 where individuals can place their names and/or e-mail addresses. An e-mail, or other notification can be sent to these individuals who may either desire to view the information already on the web page/site 25 or to submit new information by sending an e-mail, or any other notification to the web site. In this way, an e-mail is sent which allows the client at home to automatically have access to the web site.

Depending on the type of security system set up by the owner/controller of the site, new information input by third parties goes through a variety of different paths. For example, the information entered by third party individuals can be automatically added to the living virtual obituary web page/site 25, as submitted. Alternatively, their information may be forwarded to the controller (or delegated party) who will approve and/or edit the information before posting information on the virtual obituary web site/page 25. In another form the controller modifies the information for placement on the web site 25 or sends it back to the submitter for approval for posting on the web site 25. Alternatively, the controller of the web site can just simply reject the information with or without replying to the submitter. Illustrations of these paths are described later in FIG. 4.

Once information has been added to the living obituary web site/page 25, subsequent viewers have access to all of the information including that which has been most recently posted. This process is repeated as many times as people choose to add new information or comments to the living obituary web site. No time limit need be set for adding information, which may go on for years into the future. This also provides a valuable resource for people doing family tree searches for viewing and getting a greater understanding of the individual that has passed away and also information about relatives of that individual.

In the particular embodiment illustrated, the web page/site 25 has been limited to the viewing and submitting of information. In another embodiment of the present invention the service enables individuals to order hard copy goods and/or services. Referring to FIG. 1, individuals can request copies of information and/or images that had been submitted to the web site 25. This information may include, for example, images, text, and/or sound that have been submitted by friends and relatives that were unfamiliar or unknown to the viewer. In such cases the web page/site 25 provides information that is immediately links the viewer to a service provider 50, such as Print @ Kodak, over the Internet. The service provider 50 can then fulfill the request for goods and/or services and deliver the goods and/or services to the viewer. It is of course understood that appropriate mechanisms for payment of these services, the information of the types of goods and/or services requested and where they are to be delivered are provided as described in patent application Ser. No. 09/378,159, Aug. 19, 1999 which is hereby included by reference. The individual can also print locally using their personal home computer or print locally at the Kiosk 60. The benefit of the current system is that once the individual sees something that is desirable, an immediate link is made to provider 50 for the ordering of the goods and/or services. A referral fee may be collected by the web page/site 25 for any business forwarded to the provider 50 from the web page/site 25.

Figure 4:
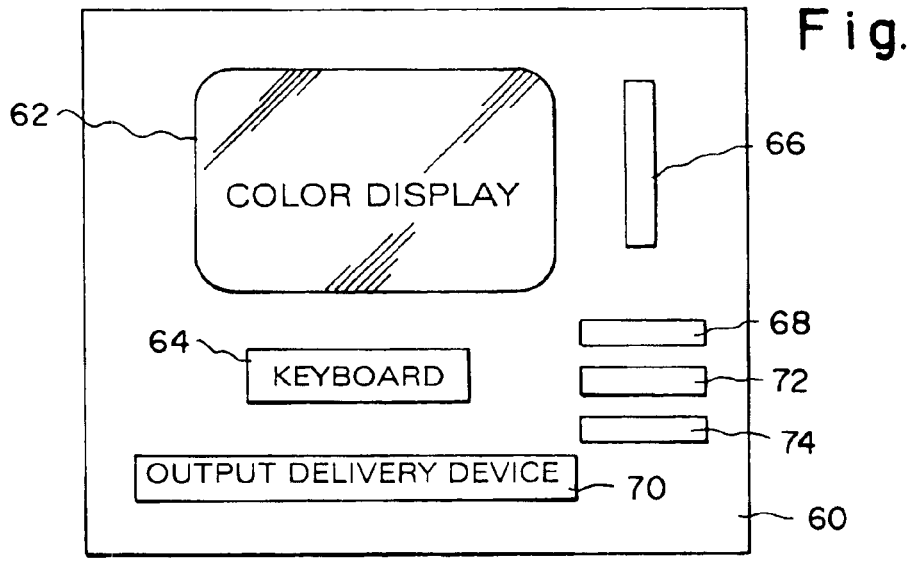
FIG. 4 illustrates a schematic diagram of a Kioskused for accessing the virtual reality obituary web page/site in accordance to the present invention.

Individuals that do not have a computer at their home can have access to web page/site 25 through the use of a Kiosk 60. Referring to FIG. 4 there is illustrated is a schematic diagram of a Kiosk 60 that can be used for accessing the virtual reality obituary web page/site 25. The Kiosk 60 is provided with appropriate input controls allowing access to the Internet 12 and to the web 25. The Kiosk 60 also includes a display screen 62, a data entry mechanism, such as a keyboard 64 for data entry by the user, and a card slot 66 having an associated reader for reading of the information on the access card 22. This Kiosk 60 can be located at a remote site placed at a business establishment such as the funeral home 14. However, it is to be understood that the Kiosk 60 can be of any commercial type and placed in any appropriate location. The Kiosk 60 having an appropriate payment mechanism 68 is capable of receiving payments for any goods and/or services. In the particular embodiment illustrated, the Kiosk 60, as shown in FIG. 3, has the capability of providing copies of text and/or images to the user. In another option, the Kiosk 60 is equipped with the appropriate devices for producing CDs, tapes, and other recordings on which images, text, sound and other data are contained. In such cases an output delivery device 70 is provided for the delivering of the requested product to the user of the Kiosk 60. Of course other input or output devices 72, 74 may be provided as desired.

In the particular embodiment described above, the access card 22 can provide automatic access to the web page/site 25. The reader (not shown) reads the barcode from the access card 22 and thereby allows instant access to the web site 25. In this situation, the access card 22 can be used to provide a type of password protection so that only individuals who possess the access card 22 and know the appropriate password are able to automatically and quickly link them to the web page/site 25. The access card 22 also includes codes for multiple access levels so that only the appropriate level of access is provided for the particular cardholder.

To better understand the present invention, a brief description of this operation will now be discussed in greater detail.

Figure 5:
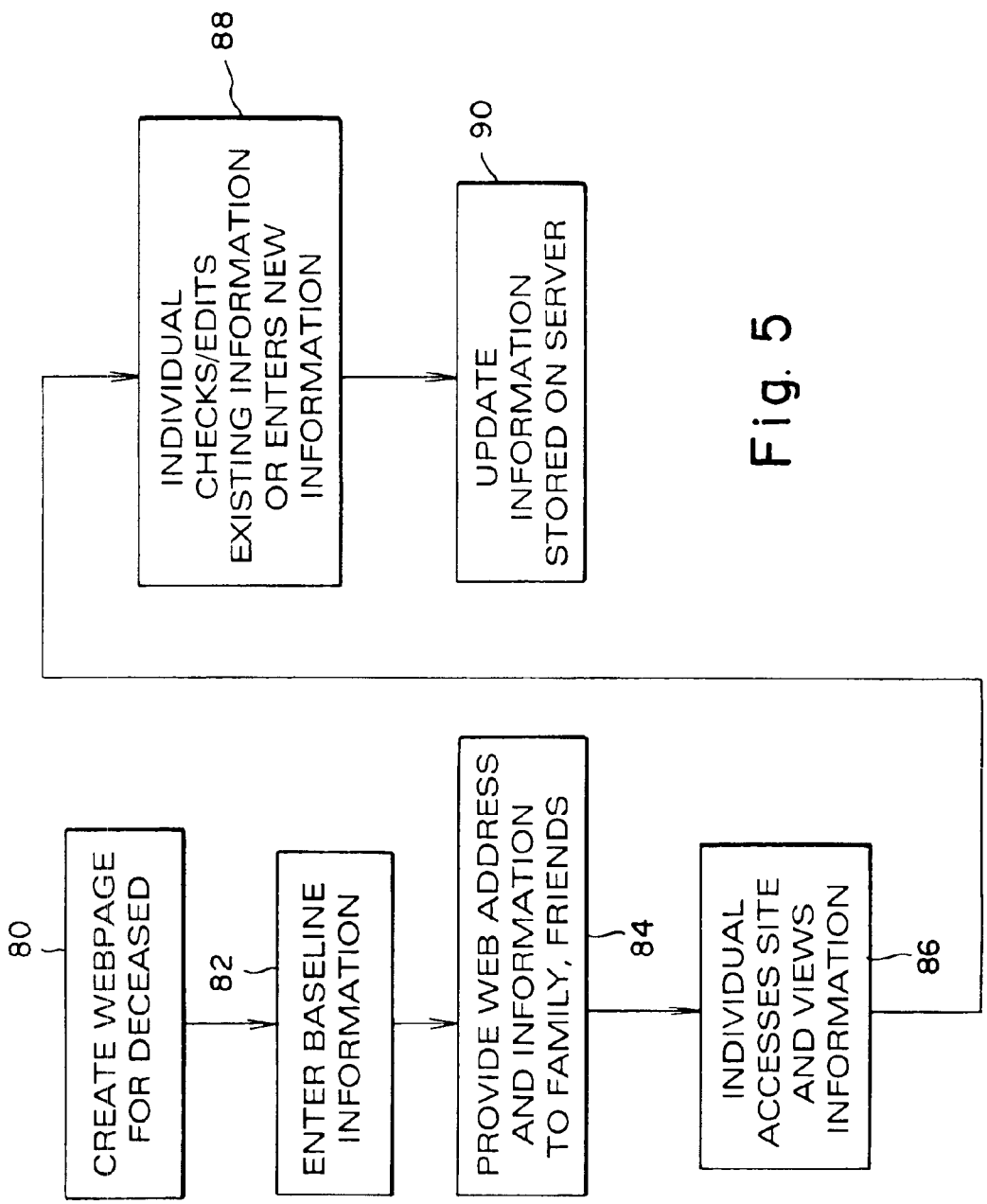
FIG. 5 describes a flow chart of one method of operation of the present invention.

Referring to FIG. 5, a flow chart describes one method of operation of the present invention. A web page/site 25 is created for the deceased, step 80. The appropriate base line information is provided on the web site, step 82. The location of the web page/site 25 and instructions/access to it are provided to desired individuals such as family members and friends, step 84. The individuals access the web site and view the information contained on it, step 86. At step 88, an individual accessing the site may check and edit previously entered information or may decide to enter new information. In one embodiment, the database storing the information is then updated, step 90 and individuals subsequently accessing the web page/site 25 will then see the updated information.

Figure 6:
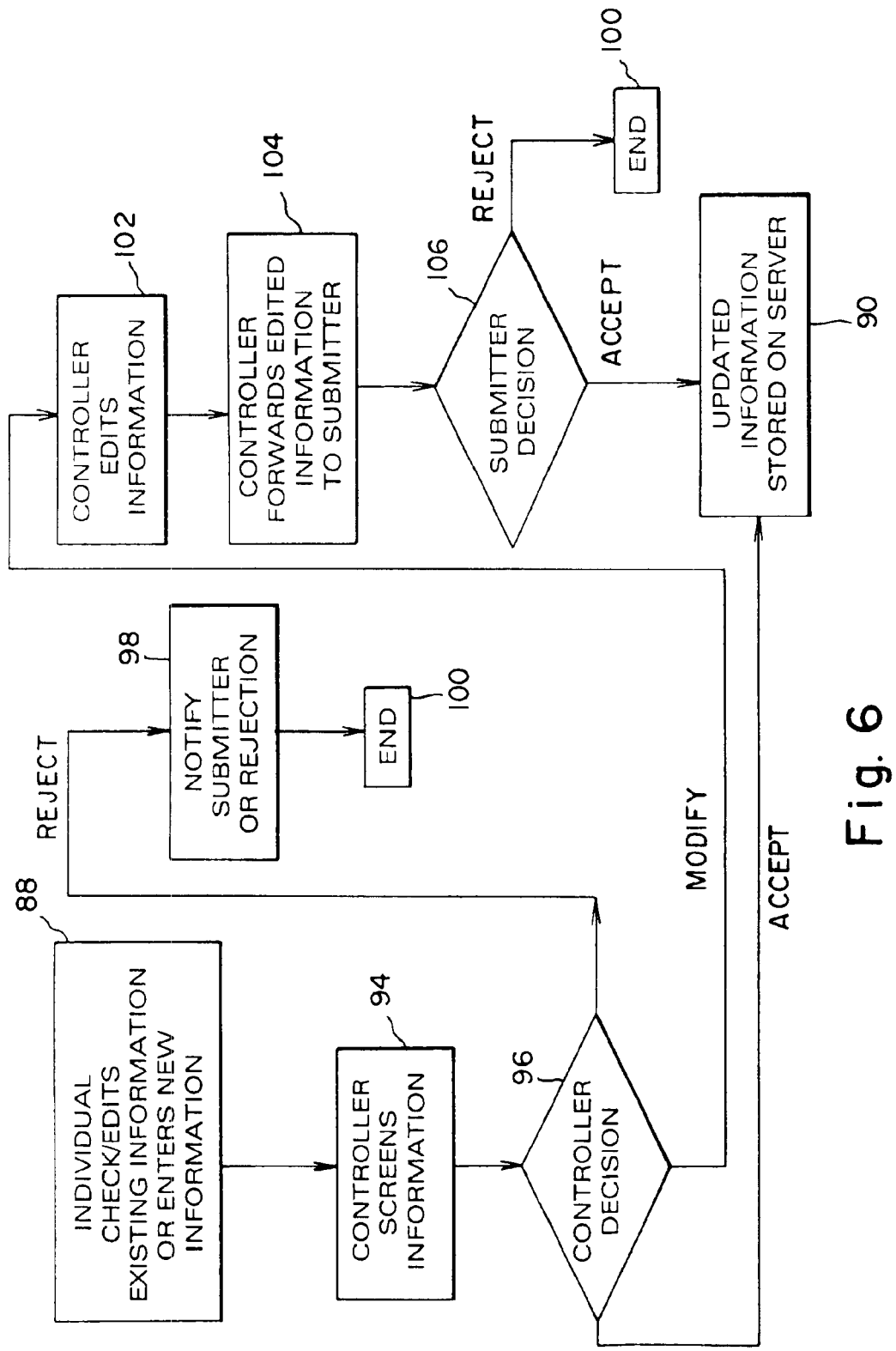
FIG. 6 describes a flow chart showing another embodiment of the present invention.

Referring now to FIG. 6, a flow chart describes another embodiment of a method of operation of the present invention. The controller of the web page/site 25 screens the information submitted, step 94, and decides whether to accept, reject, or modify the newly submitted information. If the information is accepted, the database for the web page/site 25 is modified, step 90. If the information is rejected, an email, or other notification, is sent to the submitter notifying them of the rejection, at decision block, step 96. If the controller decides to edit the information, step 102, he or she sends the modified submission back to the submitter, step 104. The submitter can either accept the edited version, decision block, step 106 in which case the database is updated, step 90, or reject the edited version, decision block, step 106, in which case the process ends, step 100.

As previously noted, not only can information be submitted by various people, it can also be shared by many viewers so that all can have a common understanding of the life of the deceased individual. Also, as previously discussed, there may be information entered onto the web page/site 25, which is new to many viewers. For example, a person may see an image of a particular event or person which is new to them, and they may wish to own a copy of it. In this system they may request that a copy of the image either from the controller of the web page/site 25 or from a service provider 50. A link may be provided to the service provider 50 whereby the information being displayed may be turned into hard copy images, CDs, or other products that the provider may offer. In addition, information may be provided on the database of where the image or text originated so that the viewing individual may go back to this individual and get perhaps a higher quality image from the original source, which then could be again turned, into a product for the user. In addition to providing these services, there may be provided incentives for people to use the service provider by the providing of coupons and certificates good for being redeemable at a particular provider based on the fact that the images were originally gathered from this web site.

One of the advantages of the present invention is that information may be added and/or shared by various individuals at any time from remote locations. This allows greater time for reflection, for remembering things about the individual, and for deciding what should be stated about the individual. Also, this invention provides a mechanism whereby information about a variety of different individuals can be grouped, commonly stored, and accessed quickly and easily in a controlled manner. Also, the present invention, by gathering names of individuals at a time when they come together at the funeral, permits information to be easily gathered from a large variety of sources. In addition, the present invention allows this information to be gathered in a relatively unobtrusive manner, i.e. by providing cards that people just simply take with them for later use. Finally, it also provides e-mail addresses so that individuals can contact each other at some appropriate time in the future.

It is to be understood that various modifications and changes may be made without departing from the present invention, the present invention being defined by the following claims.

PARTS LIST

10 system
12 Internet
14 funeral home
16 ISP/server
18 computer/server
20 data entry system
21 hosting obituary service
22 access card
24 URL
25 Web page/site
26 server
27 name of deceased
28 date
29 bar code/magnetic stripe
30 image
32 sponsor 34 front side
35 names of the surviving
36 previously deceased family members
37 template
38 authorized individuals
39 information/data
40 home
41 Internet service providers
42 office
43 Internet service providers
44 computer/server
45 computer/server
46 data entry device
47 data entry device
48 multimedia information
49 general access
50 service provider
51 private access
52 categories
55 prompt
60 Kiosk
62 display screen
64 keyboard
66 card slot
68 payment mechanism
70 output delivery device
80 step
82 step
84 step
86 step
88 step
90 step
94 step
96 step
98 step
100 step
102 step
104 step
106 step

What is claimed is:

1. A computer-implemented method for capturing and distributing memories of a deceased individual, comprising the steps of:
   providing an electronic storage memory database that can be accessed over a communication network for displaying at least two separate web sites for said deceased individual, said web sites each having a unique address for accessing information with respect to said deceased individual and providing restrictive access;
   providing an information card that includes information that can be used for allowing direct access to only one of said unique address for the user of said card;
   wherein information is provided to users when the deceased individual is being presented for viewing, said information advising said user on how to access directly at least one of said web sites;
   wherein said information comprises an information card that sets forth the electronic address of at least one of said web sites; and
   wherein at least one of said web sites includes a template which setting forth the manner and structure of the web sites.

2. A method according to claim 1 wherein each of said unique addresses comprises a URL that allows direct access to its associated web site.

3. A method according to claim 1 wherein said information is in a form that is scannable and can allow automatic direct access to said only one of said unique addresses.

4. A method according to claim 1 wherein information is provided to users at the wake or funeral of said deceased individual for allowing the users to directly access at least one of said web sites.

5. A method according to claim 1 wherein said web page is hosted by a business establishment having a plurality of such web sites for a plurality of different deceased individuals.

6. A method according to claim 1 wherein said web page includes providing may any one of the following: text, image, or sound.

7. A method according to claim 1 wherein said web sites provides multi-media information.

8. A method according to claim 1 wherein one of said web sites is a public site and wherein at least one other of said pages comprises a private web site.

9. A method according to claim 1 wherein one of said websites provides for ordering goods and/or services by providing a link to a third party site that can provide said goods and/or services.

10. A computer-implemented method for capturing and distributing memories of a deceased individual comprising the steps of:
    providing an electronic storage database for displaying a web site of said deceased individual that can be accessed over a communication network, said web page having a unique address;
    providing an access card wherein the unique site;
    wherein information is provided to users when the deceased individual is being presented for viewing, said information advising said user on how to access directly at least one of said web sites;
    wherein said information comprises an information card that sets forth the electronic address of at least one of said web sites; and
    wherein at least one of said web sites includes a template which setting forth the manner and structure of the web sites.

11. A computer-implemented system for capturing and distributing memories of a deceased individual, comprising:
    an electronic storage memory database for displaying a web site of said deceased individual that can be accessed over a communication network, a web site having a unique address;
    an access card providing said unique address for use in accessing said web site;
    wherein information is provided to users when the deceased individual is being presented for viewing, said information advising said user on how to access directly at least one of said web sites;
    wherein said information comprises an information card that sets forth the electronic address of at least one of said web sites; and
    wherein at least one of said web sites includes a template which setting forth the manner and structure of the web sites.

12. A system according to claim 1 further comprising a remote communication device for communication with said electronic storage memory database over said communication network.

13. A system according to claim 12 wherein said communication network comprises the internet.

14. A system according to claim 13 wherein said remote communication device comprises a personal computer.

15. A system according to claim 14 wherein said remote communication device comprises a Kiosk.

16. A system according to claim 15 wherein said Kiosk includes a reader for reading information from access card for allowing direct access to said unique address at said electronic storage memory database.

17. A system according to claim 16 wherein said access card includes a machine readable code which provides information for said automatic access.

18. A software product such that when loaded onto a computer it would cause the computer to do the following steps:

provoking pre-authorization for selected individual for accessing a database;

providing a gatekeeper for having editorial control over entry of data by said individuals;

providing an information card that includes information that can be used for allowing direct access to only one of said unique address for the user of said card;

providing pre-approval of information prior to being entered into said database;

wherein information is provided to users when the deceased individual is being presented for viewing, said information advising said user on how to access directly at least one of said web sites;

wherein said information comprises an information card that sets forth the electronic address of at least one of said web sites; and wherein at least one of said web sites includes a template which setting forth the manner and structure of the web sites.

* * * * *